INVENTOR.
Robert H. Bauman

INVENTOR.
Robert H. Bauman
BY D. C. Staley
His Attorney

May 8, 1962 R. H. BAUMAN 3,033,173
BRAKE BOOSTER
Filed Aug. 13, 1959 4 Sheets-Sheet 4

Fig. 6

INVENTOR.
Robert H. Bauman
BY
D. C. Staley
His Attorney

United States Patent Office 3,033,173
Patented May 8, 1962

3,033,173
BRAKE BOOSTER
Robert H. Bauman, Dayton, Ohio, assignor to General Motors Corporation, Detroit, Mich., a corporation of Delaware
Filed Aug. 13, 1959, Ser. No. 833,621
16 Claims. (Cl. 121—41)

This invention relates to pressure producing devices adapted for use on motor vehicles to aid the operator of the vehicle in applying the brakes and thereby relieve, to a large extent, the manual effort normally required in applying the brakes.

These pressure producing devices or brake booster units as they are known conventionally in the art, usually consist of a container having a movable wall structure positioned therein for reciprocable movement in the container, the movable wall structure dividing the container into two compartments, one on each side of the movable wall. One of the compartments is adapted normally to have one pressure value, usually atmospheric pressure therein on one side of the wall. The compartment on the opposite side of the wall is adapted to be exposed to the same pressure value, atmospheric pressure, or be exposed to a pressure value less than atmospheric, such as the vacuum obtained from the manifold of an engine of a vehicle, to produce thereby a pressure differential on opposite sides of the movable wall that causes the wall to be moved by the higher pressure in the direction of the lower pressure. The degree of pressure differential on opposite sides of the movable wall is regulated by a control valve operated by the operator of the vehicle that regulates the degree of vacuum or less than atmospheric pressure established at one side of the movable wall. The movable power wall is usually connected with the master cylinder of the hydraulic brake system of the motor vehicle so that when a pressure differential is effective on the movable wall or power wall to produce a power movement of the wall, the power wall moves the master cylinder piston under action of the higher pressure applied to the movable wall to displace hydraulic fluid from the master cylinder into the hydraulic brake system and thence into the wheel cylinders to apply the hydraulic brakes of the vehicle under the power effect of the movable wall of the pressure producing device.

The degree of pressure differential established on opposite sides of the movable wall or power wall is regulated by the operator of the vehicle in accordance with the degree of braking effort desired by the operator and the amount of movement of the brake pedal. The movement of the brake pedal actuates the control valve of the pressure producing device in a manner to control the degree of pressure reduction on one side of the power wall of the pressure producing device and thereby control the pressure differential effective on the power wall and the value of the power effort applied into the brake effort for displacing hydraulic fluid into the brake system of the vehicle.

The pressure producing devices or brake boosters, as conventionally provided, on the commercial market are also arranged so that if the pressure producing device should fail to operate for any reason, the master cylinder piston will be actuated by direct manual operation through a direct mechanical connection with the brake pedal of the vehicle.

Pressure producing devices, or brake boosters, that are used conventionally on motor vehicles are also constructed and arranged with mechanism adapted to transmit a brake reaction effect to the foot of the operator so that the operator obtains a "feel" of physically applying the brakes of the vehicle. The reaction effect transmitted through the reaction means of the pressure producing device operates against the physical force applied by the operator of the vehicle through the brake pedal with the result that this opposing reaction force working against the physical force applied by the operator gives the operator a "feel" of applying the brakes. The reaction mechanism is constructed and arranged so that only a part of the actual brake applying force is transmitted to the foot of the operator as "brake feel" in a predetermined proportion to the actual brake pressure.

The reaction force produced while the master cylinder piston displaces hydraulic fluid from the master cylinder is partially transmitted to the movable wall or power wall of the pressure producing device or to some stationary part of the device, only a predetermined portion of the reaction effect being transmitted to the valve control member of the pressure producing device and thereby to the foot of the operator. The operator therefore feels only a small portion of the total reaction effect with the result the physical force of applying the brakes by the operator is greatly reduced, and the full effect of power operation of the pressure producing device is utilized in applying the brakes.

There has been continuous development efforts in pressure producing devices or brake boosters for use on passenger vehicles in applying the brakes of the vehicle whereby effort on the part of the operator of the vehicle is reduced in applying the brakes particularly in that portion of the applying stroke in the initial movement of the brake pedal wherein the brake shoes are brought into contact with the brake drum to give the operator of the vehicle a soft pedal feel, at least until the power effect of the pressure producing device is available for power actuation of the master cylinder piston.

It has been considered undesirable during the initial stage of movement of the brake pedal for the operator to have a substantial "feel" of brake effort, because during the initial brake pedal movement, the brake shoes are only being moved into engagement with the brake drum with no actual brake effort occurring at the brakes. Any substantial reaction or opposing force applied to the foot of the operator during this initial portion of the brake operation gives the operator a false "feel" of brake application.

It is the desire of the designers of brake boosters for brake systems on passenger vehicles, trucks and buses to give the operator of the vehicle a "light" or "soft" brake pedal "feel" during the initial movement of the brake pedal, at least until the control valve of the pressure producing device has been moved sufficiently in response to the brake pedal movement as to establish an initial pressure differential on opposite sides of the power wall, whereupon power movement of the master cylinder piston by the power wall of the pressure producing device can take over the major portion of the effort in applying the brakes of the vehicle.

Efforts to provide the operator of the vehicle with a "soft" pedal during the initial application of the brake of the vehicle has resulted, in some instances, of completely preventing any reaction effect from being applied against the foot of the operator or opposing the operator's physical force during the initial stage of operation of the brake pedal and to allow reaction force to reach the foot of the operator for imparting brake "feel" only after a positive pressure differential is applied to opposite sides of the power wall of the pressure producing device, thereby placing the master cylinder piston under control of the power wall. Such arrangements can result in such free movement of the brake pedal that the operator obtains a "feel" of a completely free-swinging brake pedal resulting in loss of confidence in the brake system, unless such devices are very carefully engineered and designed. Even then, subsequent adjustment of the brakes can develop the same fault.

It is, therefore, an object of this invention to provide a pressure producing device to aid the physical force of the operator of the vehicle to apply the brakes wherein the reaction system for the device is effective at all times in the full brake applying stroke of the device to transmit reaction force or reaction effect to the foot of the operator at a controlled ratio wherein the major part of the available reaction effect is transmitted to the movable wall or a stationary part of the device and only a small portion of the reaction effect is transmitted to the foot of the operator; and wherein, as the reaction effect or force increases during continued application of the brakes, the ratio of the reaction force transmitted to the foot of the operator is changed or varied to increase the proportion of the reaction effect transmitted to the foot of the operator until a predetermined maximum ratio is reached for transmission of the reaction effect between the power wall of the device and the foot of the operator.

The arrangement is, therefore, such as to provide for a small reaction effect or force being transmitted to the foot of the operator during the initial portion of the brake applying stroke to provide a small "feel" at the brake pedal that the operator will know the brake shoes are being moved into engagement with the brake drum, and as soon as the power effect is available at the power wall, the ratio of the reaction effect transmitted to the foot of the operator will be increased to its predetermined maximum value that the operator will obtain a brake "feel" effort more directly in proportion to the actual brake effort during the actual brake applying portion of the stroke.

It is another obejct of the invention to provide a pressure producing device or brake booster having the features of the foregoing object wherein the reaction system for the device is arranged to provide for a gradual transition between one relatively low ratio of transmission of reaction effect to the foot of the operator and a second higher ratio to give the operator an increased brake "feel," the transition being such that the operator does not feel the increasing ratio or increasing reaction effect except as a gradual increase in force opposing movement of the brake pedal.

It is another object of the invention to provide a pressure producing device or brake booster in accordance with the foregoing objects wherein a resilient member or spring is incorporated in the reaction system in such a manner that the resilient member establishes one predetermined ratio for transmission of reaction effect to the movable wall of the pressure producing device and to the control member and thereby to the foot of the operator during the initial portion of the brake applying stroke, and then, when the reaction effect is increased by increased pressure in the master cylinder or increased pressure differential on the movable wall of the pressure producing device, the resilient member will flex in a manner to establish another ratio for transmission of reaction effect between the movable wall and the control valve of the device wherein the proportion of reaction effect transmitted to the control valve and thereby to the foot of the operator is increased, the resilient member being arranged so that the increased ratio of reaction effect will remain at a relatively constant value after a predetermined pressure is created in the master cylinder or a predetermined pressure differential is effective on the power wall of the pressure producing device.

It is another object of the invention to provide a pressure producing device or brake booster having the features of the foregoing objects wherein the reaction system for the device consists of a mechanical leverage system arranged to transmit reaction effect to the movable wall of the device and to the control member at one predetermined ratio during the initial portion of the applying stroke for the brake and then, in response to increase of reaction effect to change the leverage ratio and thereby change the ratio of transmission of reaction effect between the power wall and the control member of the device to increase the proportion of the reaction effect transmitted to the control device and thereby to the foot of the operator.

It is another object of the invention to provide a pressure producing device or brake booster in accordance with the foregoing object wherein a resilient member or spring is incorporated in the leverage system of the reaction means so as to provide one pre-established ratio in the leverage system for transmission of reaction effect to the control member of the device or to the foot of the operator during the initial portion of the applying stroke and then be activated in response to an increase of force in the pressure producing device to change the leverage ratio and increase the proportion of reaction effect transmitted to the control member and thereby to the operator of the device.

Further objects and advantages of the present invention will be apparent from the following description, reference being had to the accompanying drawings wherein preferred embodiments of the present invention are clearly shown.

Figure 1:
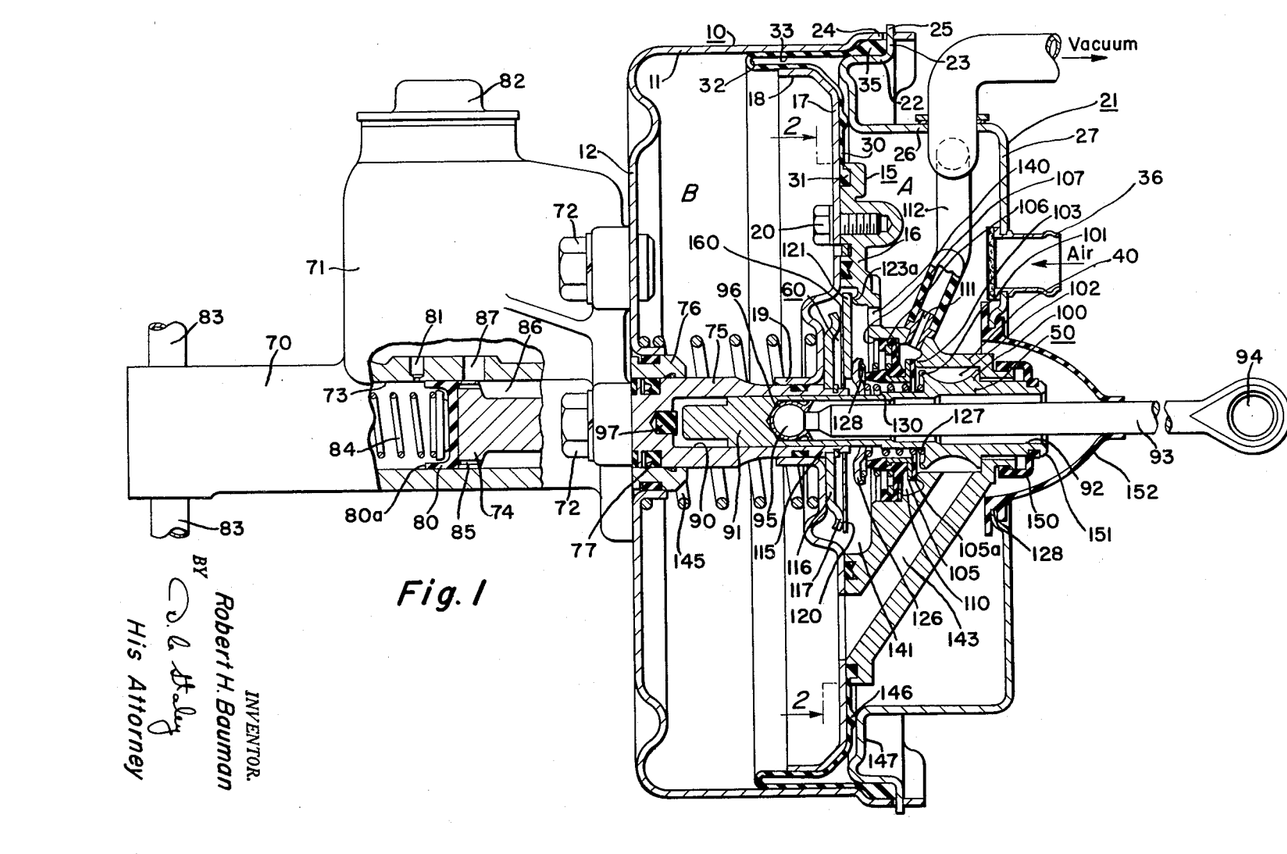
FIG. 1 is a vertical cross-sectional view of a pressure producing device or brake booster incorporating features of this invention.

In this invention the pressure producing device or brake booster consists of a cylindrical cup-shaped member 10 having the cylindrical annular wall 11 and a stationary bottom wall 12 as a continuous part of the member 10. A movable wall or power wall 15 is positioned within the cylindrical member 10 and consists of a generally annular casting 16 and a sheet metal cup-shaped member 17 having an annular outer flange 18 and an inner annular flange 19. The cup-shaped member 17 is secured to the casting member 16 by means of suitable bolts 20. A generally cylindrical cup shaped member 21 closes the open end of the member 10 and consists of an annular flange 22 that terminates in a radial flange 23 that locks in engagement with the annular flange 24 on the member 10 by means of bayonet locking members 25. The closure member 21 also consists of an axially extending annular wall 26 that terminates in a radially extending wall 27 that terminates in an opening 28.

A diaphragm member 30, which has a cylindrical form when in the relaxed or noninstalled position in the brake booster, has one end 31 thereof secured between the cup-shaped member 17 and the casting wall to form a fluid seal arrangement and secure the diaphragm to the movable wall 15. The diaphragm 30 follows generally the contour of the cup-shaped member 18 and returns upon itself from the looped end 32 with the portion 33 of the diaphragm lying against the inside wall of the annular portion 11 of the member 10, the wall portion 33 of the diaphragm terminating in an enlarged portion 35 that is retained between the annular flange 24 and the annular flange 22 and locked in position by the bayonet locking members 23 to seal the interior of the pressure producing device against leakage.

The pressure movable wall or power wall 15 divides the housing or container formed by the members 10 and 21 into two chambers A and B, the chamber A being continuously connected with atmosphere through the air inlet connection 36 provided in the wall portion 27 of the member 21. The chamber B is adapted to be exposed to atmospheric pressure or to a pressure below atmosphere, such as that received from the manifold of a motor vehicle on which the brake booster is installed, so that when the chamber B is exposed to the low-pressure source, or vacuum source, there will be a pressure differential created at opposite sides of the pressure wall or power wall 15, the higher atmospheric pressure existing in chamber A and the lower pressure existing in chamber B whereby the power wall is urged to move in a left-hand direction, as viewed in FIG. 1, when the pressure differential exists on opposite sides of the power wall 15.

The casting member 16 of the power wall 15 has an axially extending projection 40 integral therewith forming a hollow chamber that receives an operator operated control valve 50 and a reaction device or mechanism 60. The operator operated control valve 50 regulates the degree of pressure differential existing on opposite sides of the diaphragm 30 by controlling the degree of low pressure or vacuum supplied to the chamber B through the valve control structure in a manner hereinafter described.

The reaction device or mechanism 60 controls proportioning of reaction pressure received from the master cylinder of the brake system between the power wall 15 and the operator operated control valve 50 so as to proportion the reaction effect created in the master cylinder for transmission to the power movable wall 15 and to the control valve 50 and thereby to the foot of the operator to transmit a controlled proportion of the reaction effect as "brake feel" from the brake system, all of which is hereinafter more fully described.

The wall portion 12 of the cylindrical member 10 carries a master cylinder 70 and a reservoir 71 for the master cylinder. The reservoir and master cylinder are secured to the stationary wall 12 by means of the bolts or stud fasteners 72. The master cylinder 70 has an annular bore 73 in which the master cylinder piston 74 reciprocates. The master cylinder piston 74 has the end portion 75 that extends into the chamber B of the pressure producing device or brake booster. The master cylinder piston, consisting of the forward end portion 74 and the rear end portion 75, is journaled in the master cylinder bore 73 and in the bearing portion 76 that extends rearwardly from the reservoir and master cylinder casting. Suitable annular seals 77 are provided between the portion 75 of the master cylinder plunger and the bearing portion 76 to prevent loss of hydraulic fluid from the master cylinder bore 73 into the brake booster chamber B, and also prevent air pressure or vacuum from entering the master cylinder.

The master cylinder piston 74 has a cup seal 80 on the forward end thereof engaging the cylinder bore 73, and when in the fully retracted position, as shown in FIG. 1, the forward edge of the cup seal is rearwardly of the port 81 that connects the master cylinder bore 73 with the reservoir 71. Thus, when the master cylinder piston is in fully retracted position, when the brakes are released, the master cylinder bore 73 is under the same atmospheric pressure as the reservoir chamber 71, a suitable vent port (not shown) being provided in the filler cap 82 for the reservoir. A conventional residual pressure check valve (not shown) is provided in the forward end of the master cylinder bore 73 to allow displacement of the hydraulic fluid from the master cylinder into the brake lines 83 when the master cylinder piston 74 is moved in a left-hand direction, either under control of the pressure producing device or under direct manual control in a manner hereinafter described. The check valve provided in the forward end of the master cylinder bore 73 also allows return of the brake fluid from the brake lines 83 back into the master cylinder in conventional manner and thence into the reservoir 71 when the brakes are allowed to move to retracted position, but conventionally provides for retention of a small residual pressure in the brake lines 83 to prevent any possibility of air entering the brake lines. A compression spring 84 placed within the master cylinder has one end engaging the cup seal 80 on the forward end of the master cylinder piston 74 and has the opposite end engaging the residual pressure check valve in the forward end of the master cylinder to urge the piston 74 into its retracted position, as shown in FIG. 1, when the brake pedal in released by the operator of the vehicle. Passages 85 are provided in the master cylinder piston connecting the chamber 86 around the master cylinder piston with the port 87 in the bottom wall of the reservoir to prevent cavitation in the master cylinder bore 73 on sudden retraction of the piston 74 in a right-hand direction on release of the brake pedal by the operator.

The extension portion 75 of the master cylinder piston 74 that projects into the chamber B of the pressure producing device has an axial bore 90 that slidably receives the forward end 91 of the manually operable control member 50. The control member 50 has an axial bore 92 that receives the actuating rod 93 that projects exteriorly of the pressure producing device and has the connection 94 on the end thereof by which the actuating rod is connected to the brake pedal system of the vehicle for direct actuation by the operator. The forward end of the actuating rod 93 has a spherical element 95 received within a retaining member 96 for holding the actuating rod within the bore 92 in the manually operable control member 50. The control member 50 also forms valve element for controlling the degree of low pressure or vacuum supplied to the chamber B of the pressure producing device. The forward end of the bore 90 in the extension element 75 of the master cylinder has a rubber bumper 97 that may be engaged by the forward end of the control member 50 for direct and positive manual operation of the master cylinder 70 in the event the pressure producing device or brake booster should fail to operate for any reason.

The operator operated control member 50 consists of a valve element 100 that has an annular valve seat 101 on the forward face thereof. The valve element 100 operates within a chamber 102 provided in the extension portion 40 of the casting member 16. The forward end of the wall forming the chamber 102 has a valve seat 103 on which a valve element 105 is adapted to seat when the device is in the position illustrated in FIG. 1. Also, as illustrated in FIG. 1 the seat 101 is disengaged from the valve element 105 when the brake booster is in retracted position.

The valve element 105 also includes a radially extending diaphragm supporting flange 106 that seats within the recess 107 in the extension 40 of the casting element 16.

The diaphragm portion 106 of the valve element 105, together with the valve element 105 seating on the seat 103, forms an annular chamber 110 around the periphery of the valve element 105 but which is closed or sealed off from the chamber 102 when the valve member 105 is in the position illustrated in FIG. 1.

The chamber 110 has an inlet connection 111 connected with a flexible pipe line 112 that, in turn, is connected with the manifold of the vehicle on which the device is installed to provide a low-pressure source or vacuum source for supply to the chamber 110. The connection of the manifold of the engine with the chamber 110 will maintain the chamber constantly at low-pressure value or at vacuum value depending upon the value of the low pressure in the manifold of the engine.

The rearward end portion 115 of the master cylinder plunger has a sliding fit with the annular flange 19 of the cup-shaped member 17 and carries a radial member 116 in the form of a disk that has the peripheral portion thereof formed arcuately to form an annular seat 117 forming a pivot axis.

Figure 2:
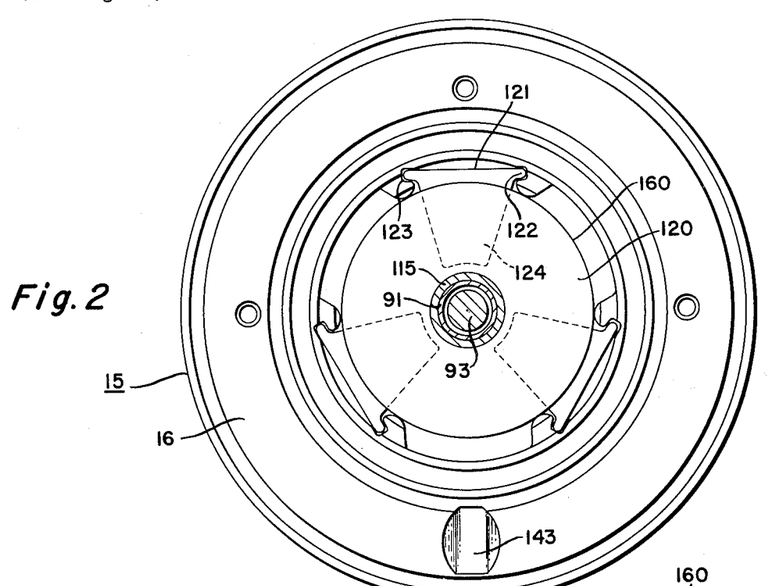
FIG. 2 is a transverse cross-sectional view of the pressure producing device of FIG. 1 taken substantially along line 2—2 of FIG. 1.
Figure 3:
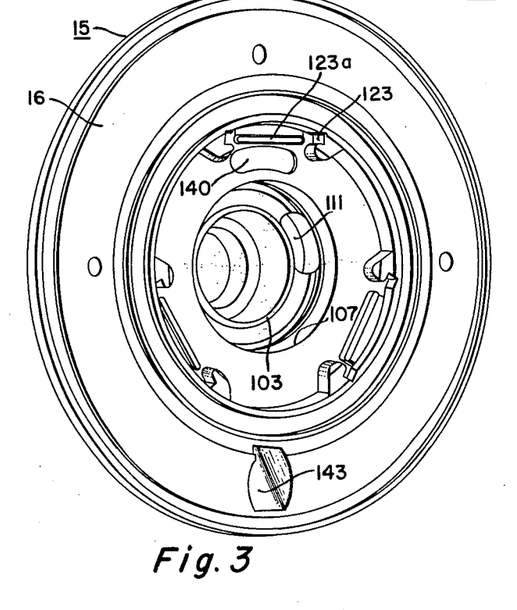
FIG. 3 is an elevational view in perspective of the power wall of the pressure producing device on which the reaction levers are supported.

A flat disk spring member 120 is loosely carried on the end portion 115 of the master cylinder piston with respect to which it is axially movable and is disposed between the seat 117 on the disk 116 and a plurality of levers 121 that are pivotally supported on the casting element 16 in the manner illustrated in FIGS. 2 and 3.

Each of these lever members 121 are in the form of a T-shaped element with the end portions 122 being received in recesses 123 in the casting element 16, the ledge portion 123a providing the fulcrum whereby the lever members 121 are pivotally supported on the casting element 16. The stem portion 124 of the lever members 120 extends toward the axis of the device, as shown in FIGS. 1 and 2.

The inner ends of the stem portions 124 of the levers 121 engage a reaction disk member 126 that is slidably carried on the plunger portion 91 of the operator operated control member 50.

A compression spring 127 extends between the reaction disk member 126 and the valve element 100 of the operator operated control member 50 and a second compression spring 128 extends between the disk 126 and the valve element 105. The compression spring 127 retains the control member 50, and specifically the valve element 100, in the position illustrated in FIG. 1 with the seat 101 disengaged from the valve element 105 when the brake booster or pressure producing device is in inactive or retracted position. The spring 128 retains the valve element 105 on the seat 103 and thereby closes the chamber 110 against connection with the internal chambers of the pressure producing device.

The springs 127 and 128 also operate to retain the disk member 126 normally out of engagement with the shoulder 130 formed on the extension portion 91 of the operator operated control member 50 and between the forward end portion thereof and the valve element portion 100, and are therefore in the reaction system for transmitting reaction effect to the control member 50 whenever pressure is produced in the master cylinder 73.

With the elements of the pressure producing device in the position illustrated in FIG. 1, which is the retracted or inactive position, chambers A and B will both be at atmospheric pressure with chamber A receiving its air through the inlet connection 36. Chamber B is connected with Chamber A at this time through the port 140, annular chamber 141, through the clearance provided in the opening 142 in the valve element 105 and thence between the seat 101 and the valve element 105 and chamber 102 which connects with the port 143 and chamber B. At this time therefore both chambers A and B are under the same atmospheric pressure so that the return spring 145 provided between the wall 12 and the movable wall 15 retains the movable wall 15 in the position shown with the resilient stop nubs 146 engaging the radial wall portion 147 of the closure member 21.

A rubber seal member 150 is provided between the end portion 151 of the manually operated control member 50 and the end of the casting extrusion 40 to prevent air from entering the chamber 102 when the chamber is under low pressure or vacuum conditions in a manner hereinafter described. A rubber dirt cover member 152 is provided between the manual control rod 93 and the wall 27 of the brake device.

Under conditions just previously mentioned with atmospheric pressure existing in chambers A and B through the passages heretofore outlined, low pressure or vacuum is retained in the chamber 110 that is connected with the vacuum source consisting of the manifold of the engine of the vehicle.

Figure 4:
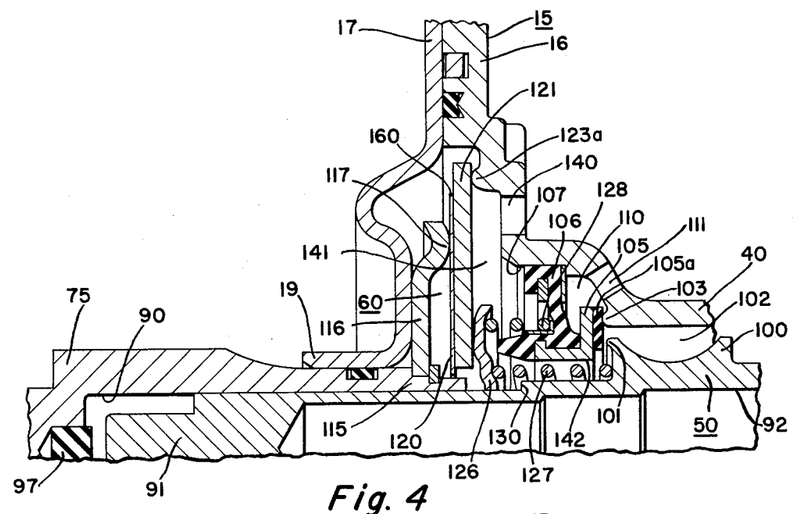
FIG. 4 is an enlarged view of a part of the pressure producing device particularly illustrating a reaction system which is shown in a neutral or brake released position.
Figure 5:
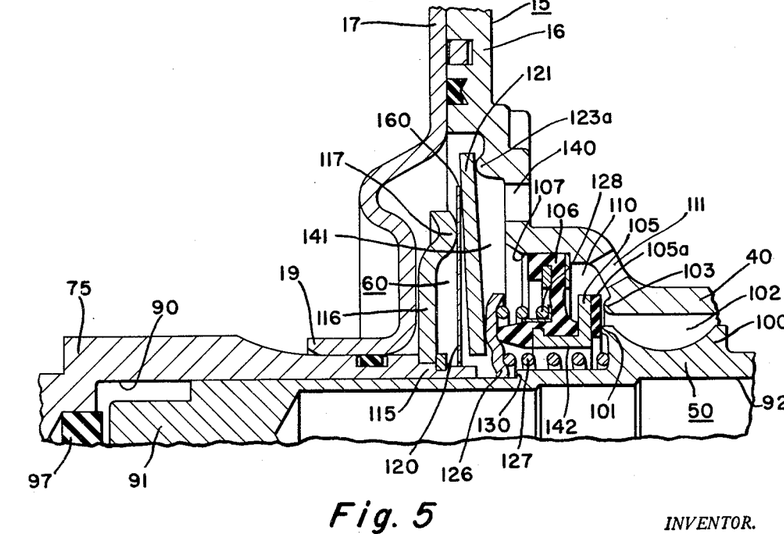
FIG. 5 is an enlarged cross-sectional view similar to FIG. 4 but with the members of the reaction system illustrated in position immediately following the initiation of the power stroke of the movable wall of the pressure producing device.
Figure 6:
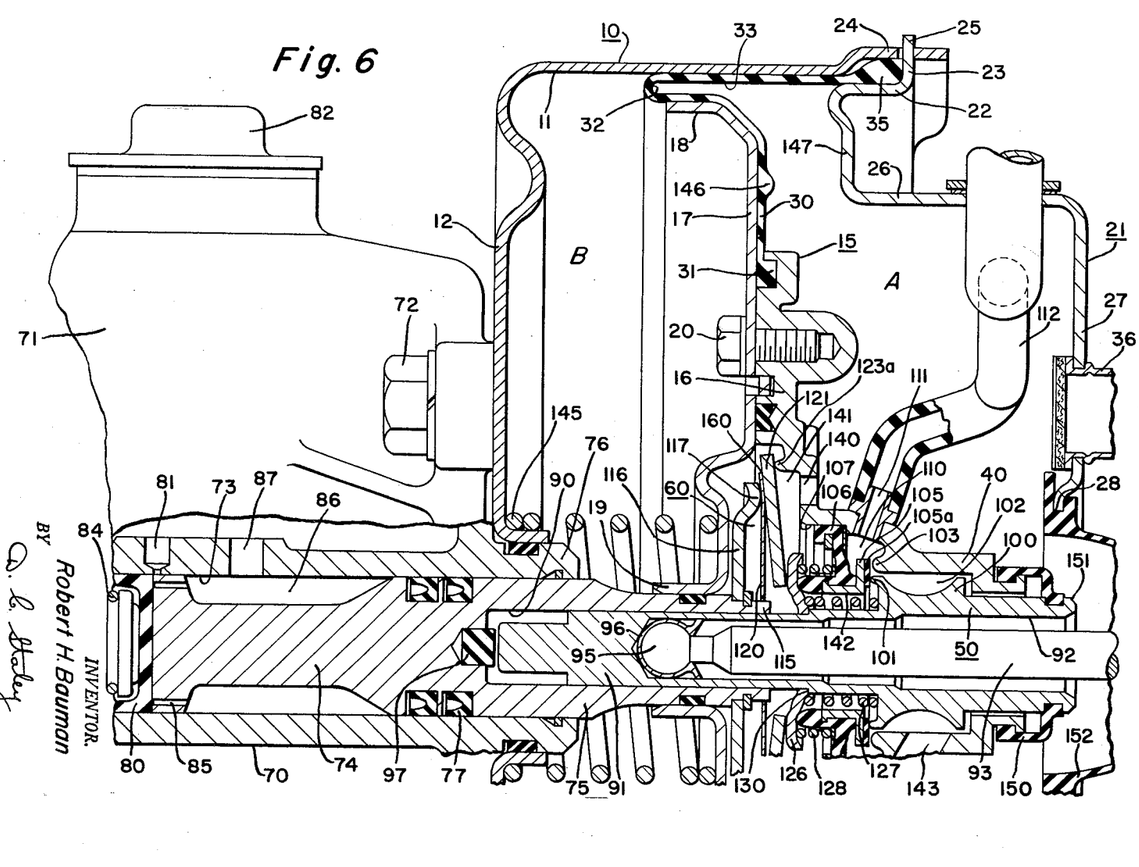
FIG. 6 is a cross-sectional view similar to FIGS. 4 and 5, but illustrating the reaction system in position for maximum transfer of reaction effect to the control member of the device.
Figure 7:
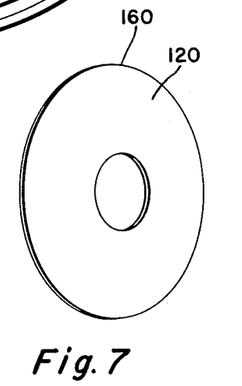
FIG. 7 is an elevational view of the resilient spring member incorporated in the reaction system that provides for changing the leverage ratio to transmit reaction effect to the control member of the pressure producing device.

Referring more particularly to FIGS. 4, 5 and 6 that are enlarged views of the reaction system and the manually operable control valve that regulates movement of the power wall 15, and at this time disregarding the flat spring disk 120 that is placed between the members 116 and 121, the operation of the device is as follows.

When the operator of the vehicle begins a brake application the first minute movement of the brake pedal under control of the foot of the operator moves the actuating rod 93 in a left-hand direction, as viewed in the several figures, a sufficient distance to cause the seat 101 on the valve member 100 to engage the seat element 105a of the valve element 105. At this time spring 127 is the only force opposing the movement of the member 50 by the operator. The manually operated control member 50 is freely slidable in the bore 90 of the master cylinder piston end portion 75. However, under this operation the left-hand end of the plunger extension 91 of the valve member 50 will not engage the bumper member 97, this engagement being reserved for failure of the power device.

This initial leftward movement of the manually operated control member 50, to effect engagement of the valve seat 101 with the seat element 105a, will not cause any movement of the master cylinder piston 74 because the compression force of the spring 84 is sufficient to retain the piston 74 in the position illustrated in FIG. 1, and the sliding friction between the member 91 and the end portion 75 of the master cylinder piston is insufficient to overcome the force effect of the spring 84.

At the time the seat 101 on the manually operated control member 50 engages the seat element 105, connection of chamber B with chamber A is broken by this valve closing engagement so that chamber 102 is now isolated from chamber A while it is still in connection with chamber B through port 143.

A slight additional movement of the control member 50 by the operator of the vehicle moves the manually operated member 50 in a slightly further left-hand direction until the seat element 105 is lifted from the seat 103 on the casting member 16. When this occurs the low pressure or vacuum existing in chamber 110 is connected with the chamber B of the brake booster through the clearance between the seat 103 and the valve seat element 105a, this clearance passage being connected with the chamber 102 and it, in turn, with the chamber B through the port passage 143.

As soon as low pressure or vacuum is available to chamber B for withdrawing atmospheric air from this chamber and reducing its pressure, a pressure differential is established between chambers A and B with the atmospheric pressure in chamber A urging the power wall or movable wall 15 of the brake booster in a left-hand direction against the action of the spring 145.

Initial movement of the power wall 15 in a left-hand direction causes left-hand movement of the master cylinder piston 74 because of the mechanical connection made between the master cylinder piston and the power wall 15 through the valve element 105, the springs 128 and 127, and the reaction system 60, with the result the forward end 80a of the cup seal 80 on the master cylinder piston 74 moves toward the port 81 between the master cylinder 73 and the reservoir until this port is closed.

During the initial portion of the applying stroke just mentioned, in which the valve element 100 seats upon the valve element 105 and valve element 105 lifts from the seat 103 and the master cylinder piston moves forward to close the port 81, no hydraulic pressure is developed in the master cylinder 73 because the port 81 is fully open so that any fluid displaced from the master cylinder piston will pass through the port 81 into the reservoir to maintain the master cylinder under atmospheric pressure.

However, during that portion of the initial applying stroke following the slight opening of the vacuum passage between valve element 105a and the valve seat 105, the pressure differential established between chambers A and B is sufficient to overcome the effect of the retraction spring 145 in the brake booster and the retraction spring 84 in the master cylinder so that the forward movement of the master cylinder piston to close port 81 is under the power effect of the power wall 15. Thus the operator of the vehicle does not feel this initial movement of the master cylinder piston to close port 81 during the portion of the applying stroke. All the operator has felt thus far is the force of the light spring 127 when closing valve seat 101 onto the valve element 105a.

However, when the port 81 in the master cylinder 70 is closed by the forward lip of the lip seal 80 on the master cylinder piston 74, hydraulic pressure will be developed in the master cylinder bore 73 on continued leftward movement of the piston 74 under action of the power wall 15 with the result the pressure increases internally in the master cylinder to displace the hydraulic fluid into the brake system to move the brake shoes into engagement with the brake drum, this being the purpose of initial displacement of hydraulic fluid from the master cylinder into the brake lines and the wheel cylinders of the hydraulic brake system on the vehicle.

When hydraulic pressure increases in the master cylinder bore 73, the counter force effect tends to urge the master cylinder piston in a right-hand direction against the action of the power wall 15. When this occurs this counter force effect or reaction effect is transmitted rearwardly through the master cylinder piston extension 75 to the disk member 116 or reaction disk as it can be referred to herein. This reaction disk 116 engages the levers 121 at a point radially inwardly of their pivot axis 123a on the casting member 16 with the result the reaction force or reaction effect transmitted by the disk 116 is divided proportionately between the power wall 15 and the reaction disk 126 carried on the member 91. The reaction force is therefore proportioned between the power wall 15 and the reaction element 126 so that only a part of the reaction effect is transmitted through the springs 127 and 128 to the manually operated control member 50 to be felt by the operator as brake applying "feel" or pressure. The initial reaction "feel" thus transmitted to the control member 50 is not sufficient to move reaction disk 126 against the compression force of springs 127 and 128. Thus the initial reaction effect or "feel" is relatively light and the brake pedal force required from the operator to set the device into operation is light so that a "soft" initial pedal is provided for the operator.

As soon as the value of the reaction feel, or proportion of reaction feel, transmitted by the levers 121 through the reaction disk 126 is equivalent to and slightly exceeds the compression rate of the springs 127 and 128, the reaction levers 121 will move gradually in a right-hand or counterclockwise direction about their pivot axis on the casting element 16 as the reaction effect increases to thereby move the reaction disk 126 in a right-hand direction, as viewed in the respective figures, against the compression of the springs 127 and 128 that are both now being supported by the valve member 100 which, in turn, is supported by the foot of the operator by means of its connection through the applying rod 93 that is connected to the brake pedal of the vehicle. Thus, any reaction force created or which is the result of hydraulic pressure developing in the master cylinder 70 is transmitted to the foot of the operator of the vehicle as brake "feel" as soon as any hydraulic pressure is established in the master cylinder 70.

The initial reaction force or effect just described produces an initial movement of the reaction disk 116, the levers 121 and the reaction disk 126 to their positions illustrated in FIG. 5.

As the reaction effect increases as a result of increase of hydraulic force in the master cylinder 70 produced by an increase of the force required in brake application, the force value of the reaction effect transmitted to the reaction disk 126 in the manner heretofore described will further compress the springs 127 and 128 until the reaction disk 126 engages the shoulder 130 on the plunger member 91. The result is that the initial reaction effect transmitted as brake "feel" to the foot of the operator is resiliently taken by the springs 128 and 127, and, as soon as the reaction force is sufficient to overcome the effect of the springs 127 and 128, the reaction effect is then positively mechanically transmitted to the member 91 through the connection between the reaction disk 126 engaging the shoulder 130 as a predetermined proportion of the total reaction effect. At this time the operator of the vehicle is receiving reaction effect from the master cylinder piston in a predetermined direct proportion to the force required to apply the brakes and in direct proportion to the pressure differential on opposite sides of the power wall 15, and also thereby in direct proportion to the pressure value in the chamber B as controlled by the manually operated control member 50.

Referring now to the action of the spring disk 120 placed between the reaction member 116 and the lever members 121, which modifies the operation just described in the following manner, spring disk member 120 is adapted to effect a change in the mechanical ratio during the initial part of the applying stroke of the brake booster or pressure producing device so that at the start of the first part of the initial applying stroke the mechanical advantage of the reaction system is high so that a major portion of any reaction effect is transmitted to the power wall 15, with only a small portion of the reaction effect being transmitted to the foot of the operator as brake "feel" through the reaction disk 126 in the springs 128 and 127. This "soft" reaction feel is desired to be retained in the brake applying stroke until the brake shoes are in engagement with the brake drums, after which the actual brake applying force is developed.

Then, when the brake booster has reached the aforementioned condition of starting the power applying portion of the brake applying stroke, the mechanical advantage of the reaction system will be changed gradually over a transition period to increase the proportion of the reaction effect transmitted to the control member 50 to more nearly approach the actual brake applying force and increase proportionately the reaction "feel" transmitted to the operator of the vehicle.

As more specifically shown in FIGS. 4, 5 and 6, when the brake applying device is in the relaxed or inactive position, illustrated in FIG. 4, the spring disk 120 is in the position shown and is relatively flat against the levers 121. It will be noticed that the outer peripheral diameter 160 of the spring disk is disposed radially outwardly a substantial distance from the pivot axis 117 provided on the reaction member 116 as related to the levers 121 in respect to their pivot axis 123a on the casting element 16. This establishes a higher mechanical force ratio through the reaction system giving a higher mechanical advantage with proportionately less reaction effect transmitted to the control member 50.

Therefore, when the initial reaction effect moves the element of the reaction system from the position shown in FIG. 4 to the position shown in FIG. 5, as heretofore described, the effective pivot axis of the reaction element 116 becomes the outer peripheral edge 160 of the spring disk 120. Since this pivot axis more nearly radially approaches the pivot axis 123a of the levers 121, the mechanical advantage of the reaction system is greatly increased. The result is the proportion of reaction effect or force transmitted to the control member 100 through the springs 127 and 128 is greatly reduced. This results in a "soft" pedal feel for the operator of the vehicle and continues at least until the port 81 between the master cylinder 73 and the reservoir 71 is closed by the cup seal member 80 on the master cylinder piston 74.

As hydraulic force increases within the master cylinder 70 with resultant action effect transmitted through the master cylinder piston 74 and the reaction disk 116 increasing, the spring disk 120 flexes gradually toward the members 121 to the position illustrated in FIG. 6, at which the mechanical ratio for proportioning reaction effect between the power wall 15 and the plunger 151 of the manually operated control member 50 is the same as when the pivot axis 117 engages the levers 121 directly.

Thus, as the reaction effect increases in the master cylinder piston for transmission rearwardly to the foot of the operator as brake "feel," the peripheral portion of the spring disk flexes and gradually and smoothly effects a transition between a high mechanical advantage or ratio established when the elements are in the position shown in FIG. 5 to a different and lower ratio or mechanical advantage when the elements are in the position shown in FIG. 6 at which the proportion of the reaction effect transmitted to the operator as brake feel is established at a predetermined value determined ultimately by engagement of the pivot axis 117 on the reaction disk 116 being in engagement with the levers 121 through the spring 120.

From the foregoing description it will be apparent that reaction "feel" is transmitted from the master cylinder piston to the foot of the operator of the vehicle as brake "feel" whenever it is possible for reaction effect to be available for transmission from the master cylinder and that the reaction effect is transmitted in one proportion or mechanical ratio during the initial applying stroke to provide a low proportion of reaction effect transmitted to the foot of the operator, which ratio or mechanical advantage is gradually changed to a predetermined ratio or mechanical advantage for increasing the proportion of the reaction effect transmitted as brake "feel" to the foot of the operator when the brake shoes are in engagement with the brake drums and pressure is applied by the operator of the vehicle in producing braking effect.

While the embodiments of the present invention as herein disclosed constitute a preferred form, it is to be understood that other forms might be adopted.

What is claimed is as follows:

1. A brake booster for applying a brake of a vehicle in which physical force is supplemented by power assistance, comprising, a power cylinder, a pressure responsive movable wall in the power cylinder, an operator operated control member to control operation of the movable wall, reaction means comprising a multiple lever system arranged to exert a reaction force varying with variations in force exerted by the movable wall and proportion the reaction effect transmitted thereby to the movable wall and the control member whereby a part of the reaction effect is transmitted to the operator as brake "feel," and a separately acting resilient member between lever elements of said lever system having an initial position with respect to the said lever elements establishing an initial mechanical ratio between the said lever elements for initial proportioning transmission of the reaction effect to said movable wall and to said control member, said resilient member being actuated by the levers of said system on increase of reaction force transmitted thereby to change the mechanical ratio between the said lever elements in proportion to the reaction effect transmitted by the said resilient member and increase thereby the proportion of reaction effect transmitted to said control member.

2. A brake booster for applying a brake of a vehicle in which physical force is supplemented by power assistance, comprising, a power cylinder, a pressure responsive movable wall in the power cylinder, an operator operated control member to control operation of the movable wall, a reaction member, lever means actuated by the reaction member and positioned in operative connection with said movable wall and said control member proportioning reaction effect from said reaction member to said movable wall and to said control member, and a flat spring member between said reaction member and said lever means having an initial position with respect to said reaction member and said lever means establishing an initial mechanical ratio between said reaction member and said lever means for initial proportioning of reaction effect to said movable wall and to said control member, said resilient spring being actuated by said lever means on increase of reaction force transmitted thereby to change the mechanical ratio between the said reaction member and said lever means in proportion to the reaction effect transmitted by the said resilient spring to increase the proportion of reaction effect transmitted to said conrol member.

3. A pressure producing device, in which physical force is supplemented by power assistance in a power applying stroke of the device to operate a brake, comprising, a power cylinder, a pressure responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a shifting ratio during the power applying stroke of the device.

4. A pressure producing device in which physical force is supplemented by power assistance in a power applying stroke of the device to operate a brake, comprising, a power cylinder, a pressure responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a shifting ratio at least during the initial portion of the power applying stroke of the device.

5. A pressure producing device, in which physical force is supplemented by power assistance in a power applying stroke of the device to operate a brake, comprising, a power cylinder, a pressure responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a continuously changing ratio at least during the initial portion of the power applying stroke of the device.

6. A pressure producing device, in which physical force is supplemented by power assistance in a power applying stroke of the device to operate a brake, comprising, a power cylinder, a pressure responsive movable wall in the power cylinder, multiple lever reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and resilient means included in the reaction transmitting means flexed by the reaction force effecting a continuously changing ratio of transmission of reaction effect to the control member during the power applying stroke until a predetermined reaction force is reached in the pressure producing device.

7. A pressure producing device, in which physical force is supplemented by power assistance in a power applying stroke of the device to operate a brake, comprising, a power cylinder, a pressure responsive movable wall in the power cylinder, multiple lever reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and resilient means included in the reaction transmitting means flexed by the reaction force effecting a continuously changing ratio of transmission of reaction effect to the control member during the initial portion of the power applying stroke until a predetermined reaction force is reached in the pressure producing device.

8. A pressure producing device, in which physical force is supplemented by power assistance in a power applying stroke of the device to operate a brake, comprising, a power cylinder, a pressure responsive movable wall in the power cylinder, multiple lever reaction means arranged to exert a reaction force varying with variations in the force exerted by the movable wall, an operator operated control member to control the operation of the movable wall, said control member being urged against the operator's force by the reaction means, and resilient reaction force dividing means flexed by reaction force included in the reaction means having one unflexed position establishing a first ratio of transmission of reaction effect to the control member and a second flexed position establishing a second ratio of transmission of reaction effect to the control member said force dividing means being flexed during the initial portion of the power applying stroke in response to increase in reaction force to change the reaction force transmitted to said control member from the first ratio to the second ratio when a predetermined reaction force is reached in the pressure producing device.

9. A pressure producing device in accordance with claim 8 wherein the said means which establishes the said first and second ratios changes the reaction effect transmitted from the said first ratio to the said second ratio in a continuously changing ratio in proportion to the degree of flexure thereof in response to the total reaction effect transmitted in the pressure producing device.

10. A pressure producing device, in which physical force is supplemented by power assistance in a power applying stroke of the device to operate a brake, comprising, a power cylinder, multiple lever reaction means arranged to exert a reaction force varying with variations in the force exerted by the movable wall, an operator operated control member to control operation of the movable wall, said control member being urged against the operator's force by the reaction means, and an independently acting resilient member included in the reaction means flexed by increasing reaction force in the pressure producing device and having an initial unflexed position to establish one ratio of transmission of reaction effect to the control member at the initiation of the applying stroke, said resilient means being flexed from its said initial position by increasing reaction effect transmitted by the reaction means to the control member to change thereby the ratio of transmission of reaction effect to the control in response to the said increase of reaction effect as the power applying stroke progresses.

11. A pressure producing device, in which physical force is supplemented by power assistance in a power applying stroke of the device to operate a brake, comprising, a power cylinder, a pressure responsive movable wall in the power cylinder, an operator operated control member to control the operation of the movable wall, reaction means arranged to exert a reaction force varying with variations in the force exerted by the movable wall including multiple lever ratioing means arranged to exert a part of a reaction effect to the operator operated control member, said control member being urged against the operator's force by the reaction means, and a separately acting resilient disc included between the lever means and flexed in response to reaction force to change the ratio effect of the said lever means during the power applying stroke.

12. A pressure producing device, in which physical force is supplemented by power assistance in a power applying stroke of the device to operate a brake, comprising, a power cylinder, a pressure responsive movable wall in the power cylinder, an operator operated control member to control the operation of the movable wall, reaction means arranged to exert a reaction force varying with variations in the force exerted by the movable wall including multiple lever ratioing means arranged to exert a part of the reaction effect to the operator operated control member, said control member being urged against the operator's force by the reaction means to effect brake "feel" to the operator, and a separately acting resilient disc included between the lever means flexed by increase of reaction effect transmitted by the reaction means to increase the ratio of the reaction effect transmitted to said control member during the power applying stroke.

13. A pressure producing device, in which physical force is supplemented by power assistance in a power applying stroke of the device to operate a brake, comprising, a power cylinder, a pressure responsive movable wall in the power cylinder, an operator operated control member to control the operation of the movable wall, reaction means arranged to exert a reaction force varying with variations in the force exerted by the movable wall including proportioning lever system means arranged to exert a part of the reaction effect to the operator operated control member, said control member being urged against the operator's force by the reaction means to effect brake "feel" to the operator, and separately acting resilient lever means included in said lever system means flexed by increase of reaction effect transmitted by the reaction means to change the ratio effect of said lever system to increase the proportion of the reaction effect transmitted to said control member during the initial portion of the power applying stroke.

14. A pressure producing device, in which physical force is supplemented by power assistance in a power applying stroke of the device to operate a brake, comprising, a power cylinder, a pressure responsive movable wall in the power cylinder, an operator operated control member to control the operation of the movable wall, reaction means arranged to exert a reaction force varying with variations in the force exerted by the movable wall including proportioning lever system means arranged to exert a part of the reaction effect to the operator operated control member, said control member being urged against the operator's force by the reaction means to effect brake "feel" to the operator, and separately acting resilient lever means included in the proportioning lever system flexed by increase of reaction effect transmitted by the reaction means to change the ratioing effect of the lever system to increase the proportion of the reaction effect transmitted to said control member during the initial portion of the power applying stroke to a predetermined maximum part of the total reaction effect transmitted to said control member.

15. A pressure producing device, in which physical force is supplemented by power assistance in a power applying stroke of the device to operate a brake, comprising, a power cylinder, a pressure responsive movable wall in the power cylinder, an operator operated control member to control the operation of the movable wall, reaction means arranged to exert a reaction force varying with variations in the force exerted by the movable wall including proportioning lever multiple system means arranged to exert a part of the reaction effect to the movable wall and a part to the operator operated control member, said control member being urged against the operator's force by the reaction means to transmit "feel" to the operator, and separately acting resilient lever ratio changing means included in the proportioning lever system and operating in a nonflexed condition on the said lever means of the said system to establish an initial ratio of transmission of reaction effect to said movable wall and to said control member, said separately acting ratio changing means being flexed by said lever system on increase of reaction effect transmitted by the reaction means to increase thereby the proportion of the reaction effect transmitted to said control member during at least the initial portion of the power applying stroke.

16. A pressure producing device, in which physical force is supplemented by power assistance in a power applying stroke of the device to operate a brake, comprising a power cylinder, a pressure responsive movable wall in the power cylinder, an operator operated control member to control the operation of the movable wall, reaction means arranged to exert a reaction force varying with variations in the force exerted by the movable wall including proportioning lever system means arranged to exert a part of the reaction effect to the movable wall and a part to the operator operated control member, said control member being urged against the operator's force by the reaction means to transmit "feel" to the operator, and separately acting lever ratio changing means included in the proportioning lever system and operating on the said lever system means to establish an initial ratio of transmission of reaction effect to said movable wall and to said control member, said separately acting ratio changing means being actuated by said lever system on increase of reaction effect transmitted by the reaction means to increase the proportion of the reaction effect transmitted to said control member during at least the initial portion of the power applying stroke to a predetermined maximum part of the total reaction effect transmitted by the reaction means.

References Cited in the file of this patent

UNITED STATES PATENTS

| 2,826,041 | Rike | Mar. 11, 1958 |
| 2,828,719 | Ayers | Apr. 1, 1958 |
| 2,867,193 | Ayers | Jan. 6, 1959 |
| 2,894,490 | Ingres | July 14, 1959 |

Notice of Adverse Decision in Interference

In Interference No. 93,729 involving Patent No. 3,033,173, R. H. Bauman, Brake booster, final judgment adverse to the patentee was rendered May 21, 1964, as to claims 3, 4 and 5.

[*Official Gazette August 25, 1964.*]